May 7, 1935.    L. S. BURGETT    2,000,161
ARC WELDING APPARATUS
Original Filed Aug. 18, 1928    5 Sheets-Sheet 1

INVENTOR
Lynn S. Burgett
BY
Arnold C. Rood
ATTORNEY

May 7, 1935.  L. S. BURGETT  2,000,161
ARC WELDING APPARATUS
Original Filed Aug. 18, 1928   5 Sheets-Sheet 2

INVENTOR
Lynn S. Burgett
BY Arnold C. Rood
ATTORNEY

May 7, 1935.　　　　　L. S. BURGETT　　　　　2,000,161
ARC WELDING APPARATUS
Original Filed Aug. 18, 1928　　5 Sheets-Sheet 4

INVENTOR
Lynn S. Burgett
BY Arnold C. Rood
ATTORNEY

May 7, 1935.　　　L. S. BURGETT　　　2,000,161

ARC WELDING APPARATUS

Original Filed Aug. 18, 1928　　5 Sheets-Sheet 5

INVENTOR
Lynn S. Burgett
BY
Arnold C. Rood
ATTORNEY

Patented May 7, 1935

2,000,161

UNITED STATES PATENT OFFICE 2,000,161

ARC WELDING APPARATUS

Lynn S. Burgett, Euclid, Ohio

Application August 18, 1928, Serial No. 300,408
Renewed March 15, 1934

14 Claims. (Cl. 219—8)

This invention relates to electric apparatus, and more particularly to welding apparatus of the dynamotor type actuated from a source of alternating current supply and delivering direct current for the welding circuit.

In electric arc welding, the welding current is preferably direct rather than alternating due to the more advantageous arc characteristics and greater ease of welding provided by the direct current. To provide direct current for arc welding, two general types of apparatus have been ordinarily employed, namely, motor-generators and dynamotors. By the term "dynamotor" I refer to the type of apparatus in which both motor and generator windings are disposed on a single armature core, thereby forming what may be termed a single-unit structure.

In the motor-generator type of welding apparatus, the motors have been driven by either alternating or direct current, dependent upon the type of energy supply available. The motor has been mechanically connected to the generator in any suitable manner. This type of apparatus, however, is of relatively low mechanical efficiency, due to friction, windage, high iron and excitation losses, and the weight and size of apparatus necessarily involved.

In welding dynamotors heretofore commercially employed, so far as I am aware, the armature has been actuated from a source of direct current supply, such as, for example, 500 volt electric railway supply. Such dynamotors, therefore, which generate direct current for welding, and which may be termed DC—DC dynamotors, have been limited in use to conditions under which direct current for power purposes is available. Furthermore, in a DC—DC dynamotor, the voltage drop from open circuit voltage to the welding voltage of the generated energy has been obtained only by dissipating said voltage by means of resistance. In other words, with a DC—DC dynamotor, dropping terminal voltage characteristics of substantial and effective amount cannot be obtained.

Objects of my invention are to provide a dynamotor type arc welding apparatus arranged to produce direct current energy for the welding circuit, said apparatus being actuated from a source of alternating current supply. Other objects are to provide arc welding apparatus of relatively high efficiency, having advantageous operating characteristics, and arranged to produce welding current of desirable and advantageous character.

Another object is to provide a welding machine embodying arc voltage control which is at least partially inductive in character, said control being capable of causing the arc voltage to vary without lag according to the fluctuation of the arc length in order to maintain the proper amperage flowing through the arc, whereby excessive inrush of current is prevented when the electrode is touched to the work in commencing the welding operation, and sufficient current is caused to flow to properly fuse the electrode metal to the work immediately upon withdrawing the electrode to establish the arc.

A further object is to provide a welding machine which will deliver substantially indefinitely the amount of current for which the machine is adjusted; in other words one in the operation of which when set to deliver current across an arc at a given amperage will maintain such amperage substantially constant at such adjustment indefinitely and will not drop the current during continued operation as is customary with all motor-generator welding machines of which I have knowledge.

Further objects are to provide arc welding apparatus embodying a dynamotor having separate alternating current and direct current windings which are electrically, but not magnetically, insulated from each other, said dynamotor being arranged to rotate at synchronous speed with attendant advantages including high power factor, said apparatus as a whole having low no-load and low mechanical losses, and drooping voltage characteristics.

Other objects are to provide advantageous features of current control and adjustment.

Other objects of the invention will be apparent to those skilled in the art from the written disclosures herein made and from the accompanying drawings wherein.

By my invention I have provided for arc welding apparatus an advantageous form of dynamotor actuated by polyphase alternating electric current and generating direct current for welding. The dynamotor comprises preferably an armature shaft carrying a single iron core. The core may be slotted to receive two separate armature windings which windings are electrically but not magnetically insulated from each other. These said windings may be disposed in the same or in separate slots, said windings being preferably disposed in the same slots. One of these windings constituting the motor or driving winding is connected to slip rings at one end of the core, said winding receiving current through the slip rings from alternating current power supply. The other winding forming the generator or output winding is connected to a commutator mounted on the shaft at the opposed end of the core.

I have thus provided a unit in which the direct current circuit is electrically insulated from the alternating current supply whereby accidental short circuits through grounded work may be prevented.

I have thus further provided a unit which, due to the two electrically insulated armature windings, may be built to operate on any standard alternating current voltage, the ratio of the number of turns in the alternating and direct current armature windings being proportionable to cause energy of the proper direct current voltage value to be generated. This feature cannot be obtained with a single or converter type of armature winding, in which, as is well known, the ratio of voltage transformation is fixed, regardless of the number of winding turns.

Another advantage of having the armature windings closely associated in the same magnetic circuit, as by disposing the motor and generator windings in the same slots, is that the armature reaction of the motor armature windings thereby substantially completely neutralizes the armature reaction of the generator armature windings, resulting in excellent commutation under the severe conditions of arc welding without necessitating the use of commutating poles, and/or large air gaps and heavy field coils.

A single stationary field for both motor and generator windings, with resulting efficient transformation of the alternating current to direct current, is disposed about the said armature. This field is preferably energized by a field winding of shunt construction. Said field is preferably self-excited by direct current generated in the above described generator armature winding. The strength of the excitation of said field winding is preferably variable by means of a rheostat. While I prefer a shunt field, a compound or series field may be employed, and in some cases a field winding may be entirely omitted, the necessary field flux being induced by the current in the armature windings.

It will be noted that the above dynamotor forms a mechanically efficient current generating unit since there is but one rotating armature and no other mechanically moving parts as distinguished from a motor generator in which there are two armatures, two fields, and a mechanical connection between the armature shafts, all with resulting disadvantages, as is well known.

Polyphase alternating current is supplied to the motor winding of said dynamotor. Adjustable inductance is preferably placed in each phase of said alternating current supply for regulation of the voltage and amperage of the welding current. An adjustable resistance is preferably disposed in the welding circuit to further assist in regulating the voltage and amperage of the welding current. Said adjustable inductances and resistance are proportioned to give the most desirable welding characteristics and are preferably mechanically interlocked and adjusted by a single control for convenience in adjustment of the machine for the particular welding conditions in hand, and further for preventing "hunting" or unstable operation of the machine. Such "hunting" or unstable operation might be caused, for example, by the presence of an excessive amount of inductance in the motor circuit when a heavy current is drawn from the supply lines, as a result of a heavy current being drawn from the welding or output circuit, such as might result from insufficient resistance in the welding circuit.

Inductance may also be disposed in the welding circuit to make the direct current more uniform in amperage value and to make the welding arc more easily maintainable by the welding operator during a given welding operation.

In operation, the armature is brought up to synchronous speed by eddy currents induced in the pole faces of the dynamotor and is retained at synchronous speed by the field excitation. By operation at synchronous speed the apparatus has a high power factor and other advantages incident to synchronous operation.

Due to the relatively heavy currents ordinarily flowing through said mechanically interlocked adjustable inductances and resistance, and to the relatively heavy capacity thus required of contactors and other switch mechanism therefor, the adjustability of such inductances and resistance is conveniently effected by taps taken at relatively widely spaced intervals, such taps being conveniently brought into operation by a range switch by means of which an approximate adjustment of the welding current value may be obtained over the range of capacity of the machine. To obtain desired welding current values intermediate those obtainable by such range switch, the field rheostat hereinbefore mentioned may be adjusted to vary the strength of the field. The variation of field strength in the manner indicated under-excites or over-excites the motor windings, causing a lagging or leading alternating current to be drawn from the supply lines into said windings. As a result, the terminal voltage of the generator windings is adjusted whereby to cause the desired amount of current to flow through the resistance in the welding circuit, whereby to give welding current of the desired amperage value.

Figure 1:
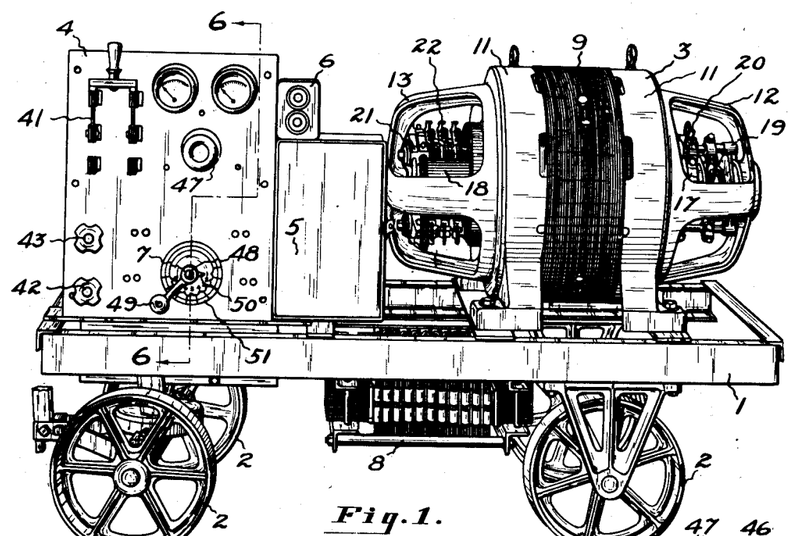
Figure 1 is a perspective view showing improved arc welding apparatus contemplated by my invention.
Figure 3:
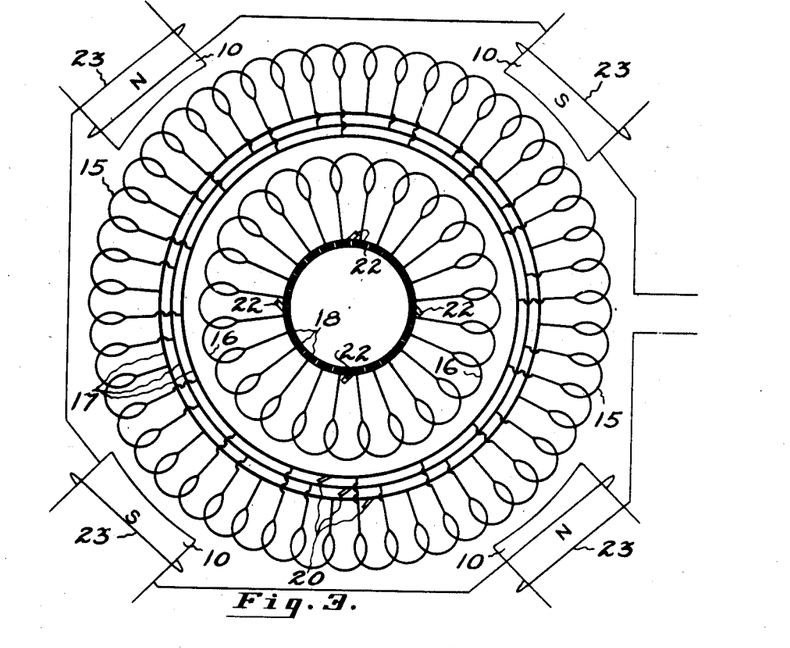
Fig. 3 is a schematic diagram illustrating the armature windings and magnetic field of the dynamotor embodied in the apparatus illustrated.
Figure 4:
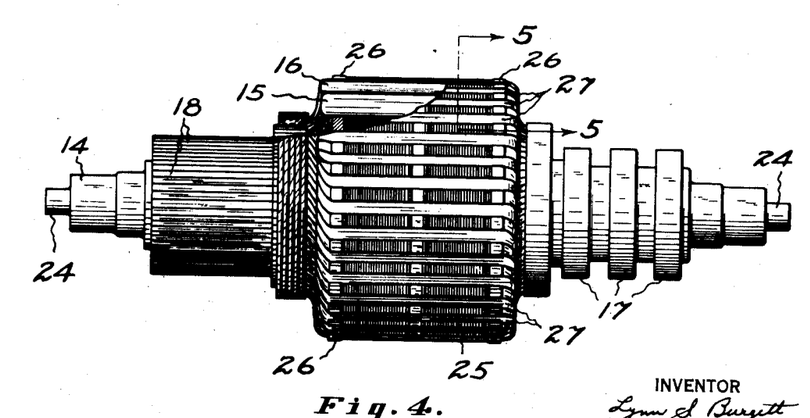
Fig. 4 is a front elevation, partly in section, of the dynamotor armature.

In the drawings a truck frame 1 is mounted on wheels 2 and serves as a support for dynamotor 3, a control panel 4, starting box 5, start-and-stop push button station 6, and a range switch 7. A stabilizer inductance 8 is attached to the under side of the frame 1. The dynamotor 3 has an iron field ring 9 which may be of laminated construction, said ring having inwardly extending field poles 10 as indicated in Fig. 3. The field ring 9 is secured between end frames 11 which carry bearing brackets 12 and 13. An armature 14 as shown in Figs. 3 and 4 is journaled in bearing brackets 12 and 13 and carries two separate armature windings 15 and 16, the winding 15 leading to slip rings 17 and the winding 16 leading to commutator bars 18. Mounted on a suitable brush holder 19 carried by the bearing bracket 12 are brushes 20 which bear against the slip rings 17. The bearing bracket 13 carries another brush holder 21 on which are mounted brushes 22 which bear against the commutator bars 18. On the field poles 10 are field windings 23 as indicated diagrammatically in Figs. 2 and 3.

Figure 5:
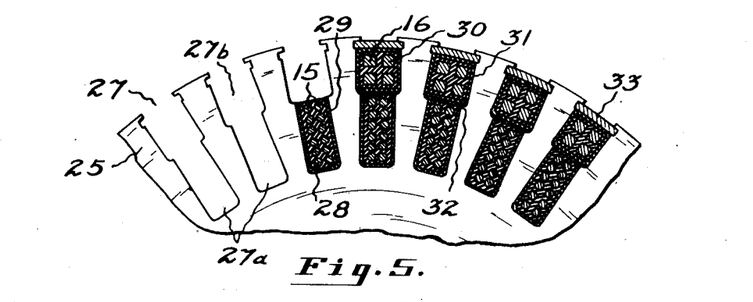
Fig. 5 is an enlarged sectional view taken on line 5—5 of Fig. 4 showing a portion of an armature lamination with winding coils disposed in certain of the armature slots.

Referring to Figs. 3, 4 and 5, the armature 14 has a central shaft 24. Secured to the shaft 24 are a number of thin circular iron plates or laminations 25. These are held together by end plates 26 also secured to the shaft 24. The laminations 25 and end plates 26 have a series of slots 27 cut in their peripheries which slots are parallel to the axis of the shaft 24. The slots 27 as cut in any one lamination may be of the shape shown in Fig. 5, having an inner rectangular portion 27a and an outer rectangular portion 27b.

Arranged in the slot portions 27a is the armature winding 15 which may be made up of a number of turns of circular copper wire 28 insulated from each other and connected electrically at suitable intervals to the slip rings 17. The winding 15 may also be insulated from the laminations 25 by an insulating liner 29 which together with the winding 15 completely fills the slot portion 27a. Arranged in the slot portions 27b is the armature winding 16 shown as made up of a number of turns of rectangular copper wire 30 of relatively large cross-sectional area, and insulated from each other. The turns of wire 30 are connected electrically at intervals to the commutator bars 18. The winding 16 is further insulated from the laminations 25 by an insulating liner 31. Between the liner 31 and the winding 15 is an insulating strip 32 extending laterally into the corners of the slot portion 27b. The insulating liner 31 when folded over the winding 16 completely fills the slot portion 27b. The armature windings 15 and 16 are shown as securely held in the slots 27 by retainer wedge strips 33 driven in from the ends of the slots after the windings have been placed in position. It will be understood that the particular construction shown may be modified to suit a wide variety of conditions as regards speed and voltage.

Figure 2:
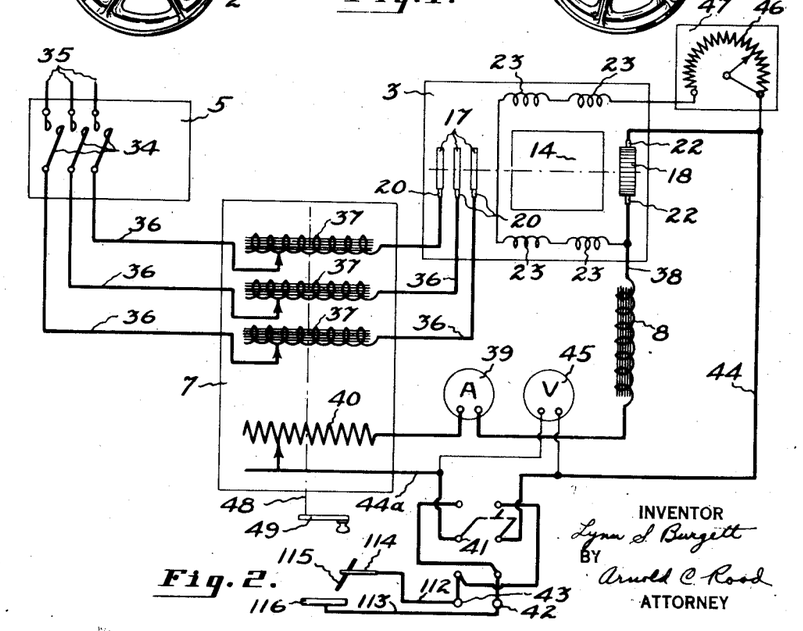
Fig. 2 is a schematic diagram of the electrical features of the apparatus shown in Fig. 1.

Referring to Figs. 2 and 3, polyphase alternating current at a suitable voltage is supplied through brushes 20 to slip rings 17, and is distributed to the windings 15. In starting the dynamotor the armature 14 is brought up to synchronous speed in the manner of an induction motor due to the reaction caused by eddy currents induced in the pole faces 10.

Pole face windings (not shown) may be used to assist the dynamotor in starting and to prevent hunting after the machine has reached synchronous speed as will be readily understood by those skilled in the art. As the armature comes up to speed, a voltage is generated in the armature winding 16 by its reaction with the field induced by the starting current flowing in armature winding 15. The commutator bars 18 deliver this generated current to the brushes 22 as direct current. The field windings 23 being connected across the brushes 22 are thus supplied with direct current which rapidly builds up field magnetism between the field poles 10 until a state of equilibrium has been reached, and the dynamotor then continues to generate direct current at a voltage dependent upon the supply voltage impressed on armature winding 15, the ratio of the number of turns in armature windings 15 and 16, and the field strength.

The operation of the dynamotor is controlled from the control panel 4 and by the push button station 6. The push button station 6 operates through magnetic relays contained in starting box 5 (not shown) to open or close contactors 34 which receive polyphase alternating current from a source of supply through lead-in cables 35. Conductors 36 connect the contactors 34 through variable inductances 37 to brushes 20 of the dynamotor 3. The generated direct current is carried from one set of brushes 22 of the dynamotor 3 through conductor 38 to the stabilizer inductance 8, thence through the ammeter 39 to a variable resistance 40 and through lead 44a to a double pole double throw switch 41. The switch 41 is so connected to the terminals 42 and 43 that by throwing the switch from one closed position to the other, either terminal 42 or 43 may be made positive.

A welding cable 112 may connect the terminal 43 with the electrode holder 114 carrying the electrode 115, and a return or ground cable 113 may connect the work 116 to the terminal 42. The double pole double throw switch 41 is used to adjust the polarity of the terminals 42 and 43 since the machine, when starting, may synchronize with the supply circuit to give a positive polarity to either terminal 42 or 43. The object of the stabilizer inductance 8 is to prevent the arc from being broken due to irregularities in the welding circuit, such as varying arc length, arc blowing, etc. This action results from the voltage induced in the stabilizer which maintains the arc during these irregularities.

Direct current returns from the switch 41 to the dynamotor 3 through the conductor 44. Across the conductors 44 and 44a is connected a voltmeter 45. The field windings 23 are connected in series with each other and in series with a variable resistance 46 contained in the rheostat 47. Field windings 23 and variable resistance 46 constitute the field circuit which is shown as connected in shunt with the armature winding 15 connected to conductors 38 and 44.

The variable inductances 37 and the variable resistance 40 are mounted back of the panel 4 and are controlled by a range switch 7 with a shaft 48 extending through the panel 4 to a handle 49. A pointer 50 (Fig. 11) connected to the shaft 48 indicates on a dial plate 51 the welding current ranges corresponding to various positions of the handle 49, said current ranges being indicated preferably in terms of both amperage and dimension of welding electrode, whereby to indicate to a welding operator the proper amperage to employ for a given electrode, and vice versa, and whereby the apparatus may be properly adjusted knowing either the electrode dimension or amperage to be employed.

Figure 6:
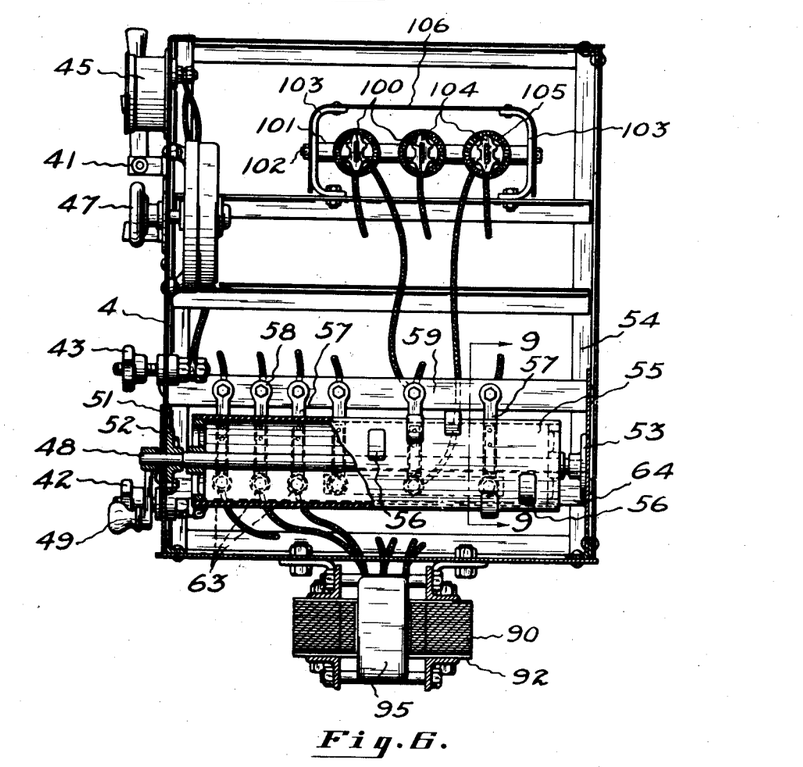
Fig. 6 is a vertical sectional view taken on line 6—6 of Fig. 1 showing control apparatus including resistors, inductances, and contactors.
Figure 9:
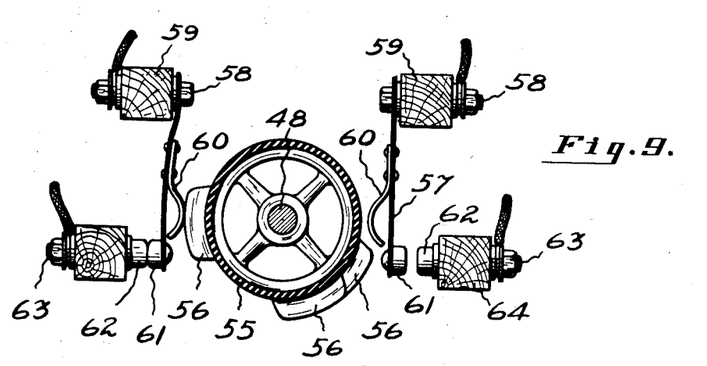
Fig. 9 is an enlarged sectional view taken on line 9—9 of Fig. 6 showing certain of the contactors in the control apparatus.

Referring to Figs. 6 and 9 the shaft 48 is journaled near one end in a bearing 52 attached to the panel 4 and at the other end in a bearing 53 attached to the frame-work 54. Mounted concentrically on the shaft 48 is a cylinder 55 of insulating material such as fibre or hard rubber. Attached to the outside of the cylinder 55 are a number of shoes or cams 56. On either side of the cylinder 55 are shown a series of contactors 57 made of spring brass or other slightly yielding material. Each contactor is shown as secured at its upper end by terminal bolts 58 to upper terminal bars 59 which may be of wood or other insulating material. Attached to each contactor 57 and so disposed as to permit engagement with a corresponding shoe 56 on the cylinder 55 is a curved wearing strip 60 preferably made of spring material. At the lower end of each contactor and extending outwardly is a contact button 61. Opposite each contact button 61 and extending inwardly is a button 62 attached to the terminal bolt 63. Terminal bolts 63 are supported by lower terminal bars 64. Upper and lower terminal bars are parallel to the axis of the shaft 48 and are secured to the panel 4 and to the frame-work 54. The terminal bars 59 and 64 supporting the contactors 57 are so disposed with respect to the cylinder 55 that by rotating the shaft 48 certain shoes 56 bear against wearing strips 60 causing the contactors to be deflected outwardly until contact buttons 61 touch buttons 62. The shoes 56 are so disposed on the surface of the cylinder 55 that as the shaft 48 is turned by the handle 49, one contactor after another is engaged or is released according to a predetermined schedule. It will be noted in Fig. 9 that one contactor is shown in the open position and one in the closed position. The contactor 57 and the wearing strip 60 are preferably made so that when the button 61 bears against the button 62 there is a sliding or wiping action which tends to keep the contacting surfaces clean.

Figure 7:
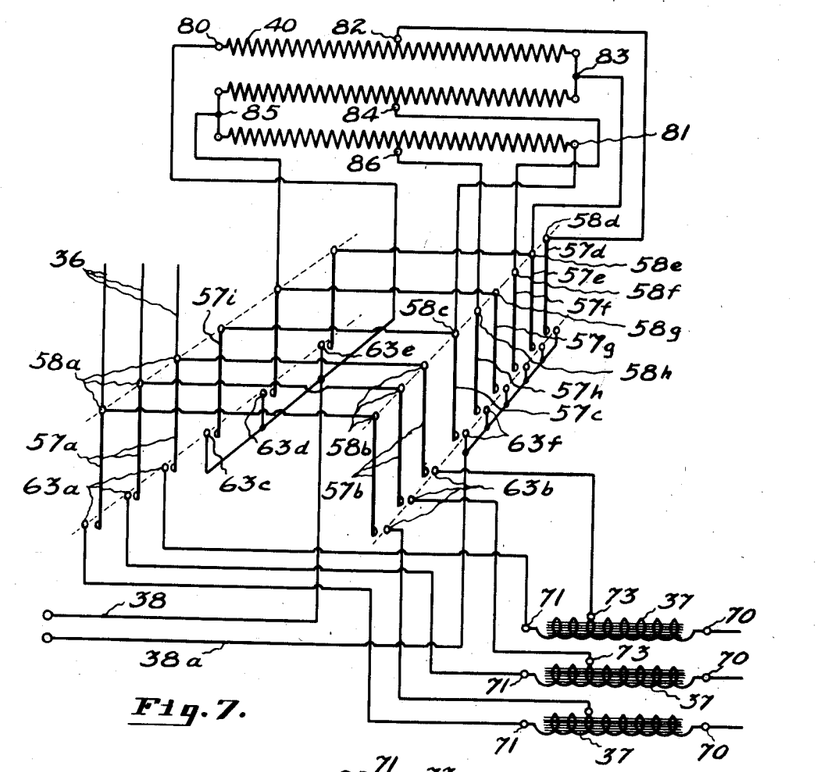
Fig. 7 is a schematic diagram illustrating the connections of the control apparatus.

The variable inductances 37 and variable resistances 40 as indicated in Fig. 2 are shown in more detail in Fig. 7 in conjunction with the contactors 57. A variation in the amount of inductance is obtained by cutting in or out of circuit definite amounts thereof, and similarly a variation in resistance is obtained by cutting in or out of circuit portions of a resistance grid. The variable inductances 37 each have terminal leads 70 which connect to the slip rings of the dynamotor 3. The other ends of each inductance 37 have terminal leads 71 which connect to terminal bolts 63a. Between terminal leads 70 and 71, taps 73 are taken off and connected to terminal bolts 63b. Contactors 57a and 57b are connected through terminal bolts 58a and 58b to the alternating current conductors 36. When contactors 57a are all engaged in inductance interposed in the power circuits leading to the dynamotor is at a maximum and when contactors 57b are engaged the inductance is at a minimum.

The variable resistance 40 has end terminals 80 and 81. At suitable points taps 82, 83, 84, 85 and 86 are taken off and connected to terminal bolts. Terminal 80 is connected in common to the terminal bolts 63c, 63d and 63e and to the conductor 38 which is connected to the direct current side of the dynamotor 3 as shown in Fig. 2.

Terminal 81 is connected to terminal bolt 58c. The taps 82, 83, 84, 85 and 86 are connected respectively to terminal bolts 58d, 58e, 58f, 58g and 58h. By engaging certain of the corresponding contactors 57c, 57d, 57e, 57f, 57g and 57h, current flows through the conductor 38 through all or part of the resistance 40, through contactors to terminal bolts 63f and through conductor 38a to the switch 41 as shown in Fig. 2. When contactor 57c is engaged and the others mentioned above are released the resistance interposed in the circuit is a maximum, as the current must then pass through the whole resistance 40. When contactors 57i and 57c are engaged and the others released the resistance interposed is zero as the resistance 40 is completely short circuited. Between maximum and zero many steps are available by engaging and releasing various contactors. It will be seen that the variable inductances 37 and the variable resistance 40 can be made to vary simultaneously or individually according to some predetermined plan dependent upon the relative fixed positions of the shoes 56 with respect to each other on the cylinder 55.

Figure 8:
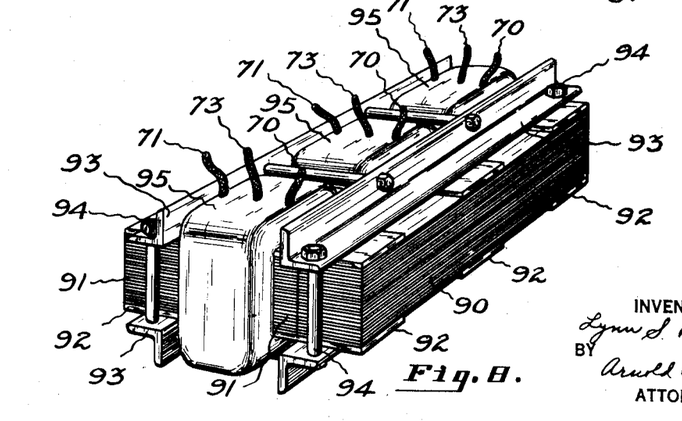
Fig. 8 is a perspective view of the inductances used to control the alternating current input to the dynamotor.

In Fig. 8 is shown a perspective view of the variable inductances 37. A laminated iron core is shown made up of side pieces 90 and cross pieces 91 held in position by cross plates 92 which extend over the cross pieces and to the edges of the side pieces 90. Side pieces 90 and cross pieces 91 are clamped firmly together by angle irons 93 and bolts 94. On each cross piece 91 is an inductance winding 95 properly insulated and covered. Each winding 95 has terminal leads 70 and 71 and tap leads 73 which are connected as shown in Fig. 7.

Figure 10:
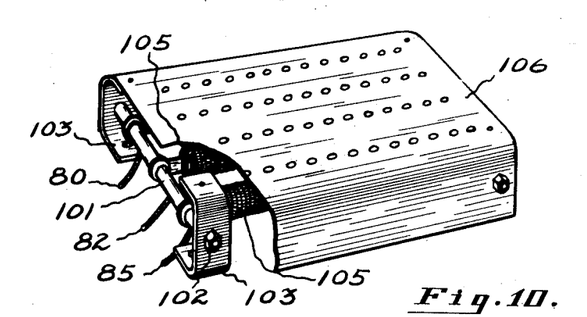
Fig. 10 is a perspective view partly broken away of the housing for the resistance grids showing resistance grids within.

In Fig. 10 is shown a perspective of the variable resistance 40. Referring to Figs. 6 and 10, it will be seen that rectangular bars 100 are secured at their ends to cross members 101 which are attached by bolts 102 to supports 103. On the bars 100 are sectional insulators 104 with shallow top and bottom grooves. Coils of resistance wire 105 are wound over the insulators 104 resting in the shallow grooves, from end to end of the bars 100. Terminal leads as shown in Fig. 7 are taken off from the ends and intermediate points of the resistance coils. A cover plate 106 perforated with holes to allow cooling of the resistance coils is secured to the supports 103.

Figure 11:
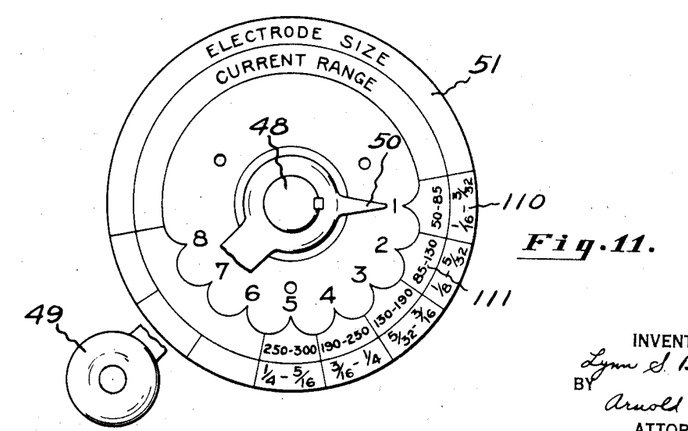
Fig. 11 is an enlarged view of the dial plate shown on the control panel in Fig. 1.

In Fig. 11 is shown an enlarged view of the dial plate 51. The markings showing electrode size 110 and current range 111 enable the operator to set the range switch and get the proper relation of current and electrode size very readily. Regulations of the welding current delivered by the machine is accomplished as follows:

The operator sets the pointer 50 at the approximate current required and then obtains the exact current value by regulation of the field rheostat 47. The position of the pointer 50 determines the amount of inductance in the dynamotor supply lines and the amount of resistance in the welding circuit. Variation of the field current causes the dynamotor which operates as a synchronous motor to be under-excited or over-excited. This causes a lagging or a leading current to be drawn from the supply lines because of the inductances 37 and the internal inductance of the windings of the dynamotor. The result as previously pointed out is to raise or lower the voltage delivered at the generator terminals giving a drooping voltage characteristic of any desired degree.

By the means for obtaining a lagging or leading current of desired degree through the motor winding, together with suitable adjustable resistance in the welding circuit, it will be noted that I have provided welding current of novel and advantageous characteristics from the standpoint of ease and quality of welding. For example, considering an open circuit voltage of 60 volts, the coltage impressed on the arc during the welding may be reduced to say 35 volts by causing the alternating current supply to lag or lead to the desired degree, which voltage may be further reduced to the actual arc voltage of say 20 volts by the adjustable resistance. The said reduction of voltage from 60 to 35 is thus accomplished in such manner as to provide efficient operation of the machine and the said reduction of said 35 to 20 is accomplished in such manner as to give ease in manipulation of the arc during welding. The net result, therefore, is to provide a relatively high standby voltage (35) to assist in maintaining the arc under conditions tending to blow out the same, for example, manual lengthening of the arc, rust, moisture, or scale on the work, etc. At the same time the reduction of the voltage from 35 to 20 by resistance permits of maintaining the welding current at approximately the desired amperage under varied arc conditions due in part to the fact that the voltage impressed on the arc is instantaneously varied in accordance with the arc fluctuations without substantially affecting the amount of current flowing across the arc. The numerical values as to the voltage are given, of course, mainly by way of example, the actual voltages depending upon the requirements in any given case.

The advantageous characteristics of apparatus for my invention in the initiation of the welding operation have been brought out by actual welding and by numerous oscillograph tests. Thus, at the start of a welding operation when the electrode 115 is contacting with the work 116, an excessive inrush of current through said electrode and work is prevented, due to the presence of resistance in the welding circuit, whereby sticking of the electrode to the work and "melting through" of thin work is prevented. Moreover, when the electrode 115 is withdrawn from the work 116 to initiate the arc, the arc current is not reduced substantially below the desired welding current, whereby good fusion may be obtained at the very start of the welding. Furthermore, since the resistance is non-inductive, upon such withdrawal of the electrode, sufficient standby voltage is available to be delivered to the arc without lag so as to readily maintain the arc, thus rendering it easy for the operator to start welding and also assisting in obtaining good fusion from the very start of the weld.

By the association of the adjustable inductance and resistance in my machine, it will be noted that the heat produced within the machine during the operation thereof does not substantially affect the amperage value delivered by the machine, since the tendency of the resistance to increase by the heat is substantially offset by the tendency of the inductance to become less effective as a result of the heat. As a result, the machine can deliver substantially indefinitely the amount of current for which it is adjusted.

It will thus be seen that I have provided improved arc welding apparatus of advantageous construction which is efficient in operation and which has advantageous welding characteristics from the standpoint of the welding operator and from the standpoint of quality of the weld.

It will be understood that apparatus embodying the advantageous features of my invention might be employed for other purposes than arc welding. Thus, for example, apparatus embodying my invention might be employed in the charging of storage batteries or for any other purpose where direct current of relatively high amperage and relatively low voltage is desired.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In electric arc welding apparatus of the dynamotor type, in combination, an armature, separate motor and generator windings carried by said armature, means for transmitting polyphase alternating current to said motor winding, a field winding excited by direct current, a welding circuit for taking off direct current generated in said generator winding, variable inductances associated with the phases of the alternating current supplied to said motor winding, each said phase having one of said inductances associated therewith, and adjustable resistance connected in series with said welding circuit, and means for simultaneously varying said inductance and resistance.

2. In arc welding apparatus of the dynamotor type, in combination, an armature containing slots for windings, motor and generator windings disposed in the same slots whereby the armature reaction of the motor winding may substantially neutralize the armature reaction of the generator winding, means for transmitting polyphase alternating current to said motor winding, each phase of polyphase alternating current having a variable inductance associated therewith, a single stationary field for both motor and generator windings excited by direct current, a welding circuit for taking off welding current generated in said generator winding, adjustable resistance connected in series with said welding circuit, and means for simultaneously varying the inductances in the alternating current supply and the resistance in the welding circuit.

3. In an arc welding apparatus of the dynamotor type, in combination, an armature, separate motor and generator windings carried by said armature, conductors for transmitting polyphase alternating current to said motor windings, a variable inductance associated with each phase of the alternating current, a welding circuit supplied with direct current from said generator windings having a variable resistance connected in series therewith, and means for simultaneously varying said inductance and resistance.

4. In a dynamotor, an A. C. input side, a

D. C. output side, and a mutual excitation means, a D. C. voltage control in the A. C. side, a D. C. voltage control in the D. C. side, and a field excitation control means, two of said controls being connected together for simultaneous operation.

5. In a dynamotor, an A. C. input side, a D. C. output side, and means for exciting a field for both, means for controlling the D. C. output and located in the A. C. side, additional means controlling the D. C. output and located in the D. C. side, connecting means between the aforesaid controls whereby they are operated together, and a third control for D. C. voltage independently operated.

6. In a dynamotor, an A. C. input side, a D. C. output side, means in the A. C. input side to obtain drooping characteristics in the D. C. voltage, additional means in the D. C. side to obtain such drooping characteristics, said two means being connected together for simultaneous operation.

7. In a dynamotor, an A. C. input side, a D. C. output side, variable means in the A. C. input side to obtain drooping characteristics in the D. C. voltage, additional variable means in the D. C. side to obtain such drooping characteristics, and means for simultaneously varying both said variable means.

8. In a dynamotor having an A. C. input side and a D. C. output side, inductance connected in the A. C. side in series so as to obtain drooping voltage characteristics in the D. C. output, and resistance connected in series in the D. C. side likewise to cause drooping voltage characteristics in the D. C. output.

9. In a dynamotor having an A. C. input side and a D. C. output side, variable inductance connected in the A. C. side to cause drooping voltage characteristics in the D. C. output and variable resistance connected in the D. C. side likewise to cause drooping voltage characteristics in the D. C. output.

10. In a dynamotor having an A. C. input side and a D. C. output side, variable inductance connected in the A. C. side to cause drooping voltage characteristics in the D. C. output, and resistance connected in series in the D. C. output line likewise to cause drooping voltage of said output, and a field excitation for said dynamotor together with means for varying said excitation.

11. In a dynamotor having a polyphase A. C. input side, and a D. C. output side, a variable inductance connected in each phase of the A. C. side to cause drooping voltage characteristics in the D. C. output, and a variable resistance connected in the D. C. side likewise to cause drooping voltage characteristics in the D. C. output.

12. In a dynamotor of the kind described, an A. C. input side, a D. C. output side, means in the A. C. side to cause drooping characteristics in the D. C. voltage, means in the D. C. side likewise to cause such drooping voltage characteristics, means for excitation of said dynamotor, said excitation means being across the D. C. side of the dynamotor, both of said means producing drooping voltage and said self-exciting means cooperating to produce a substantially no voltage condition at maximum generator load.

13. In a device of the kind described, an A. C. input side, a D. C. output side, inductance in the A. C. side to give drooping voltage characteristics to the D. C. voltage, means in the D. C. side likewise to give such drooping characteristics, means for self-exciting said machine from said D. C. output, both of said drooping voltage producing means and said self-exciting means cooperating to produce a substantially no voltage condition at maximum generator load.

14. In a device of the dynamotor type, an A. C. input side, a D. C. output side, means in the A. C. side to cause drooping voltage characteristics in the D. C. voltage, means in the D. C. side likewise to cause such drooping voltage characteristics, self-exciting means for said machine across said D. C. side, and means for varying said excitation means.

LYNN S. BURGETT.